United States Patent
Sugahara et al.

(10) Patent No.: US 7,178,968 B2
(45) Date of Patent: Feb. 20, 2007

(54) SURFACE LIGHT SOURCE DEVICE AND LIQUID CRYSTAL DISPLAY DEVICE

(75) Inventors: Tatsuo Sugahara, Mie (JP); Takafumi Hara, Kyoto (JP); Fujio Ueda, Mie (JP); Tatsuya Kudari, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 10/936,506

(22) Filed: Sep. 9, 2004

(65) Prior Publication Data

US 2005/0141245 A1    Jun. 30, 2005

(30) Foreign Application Priority Data

Sep. 10, 2003  (JP) ............................. 2003-318683
Aug. 19, 2004  (JP) ............................. 2004-239881

(51) Int. Cl.
    *F21V 7/04*    (2006.01)
(52) U.S. Cl. ....................... 362/633; 362/613; 349/58
(58) Field of Classification Search ................ 362/632, 362/633, 634, 613; 349/58
    See application file for complete search history.

(56) References Cited

U.S. PATENT DOCUMENTS 6,466,283 B1 *  10/2002  Peng ............................. 349/58
6,504,587 B1 *   1/2003  Morishita et al. ............. 349/58

FOREIGN PATENT DOCUMENTS

| JP | 2000-75273 A | 3/2000 |
| JP | 2001-249619 A | 9/2001 |
| JP | 2003-50549 A | 2/2003 |

* cited by examiner

*Primary Examiner*—Renee Luebke
*Assistant Examiner*—Zahra I. Bennett
(74) *Attorney, Agent, or Firm*—Birch, Stewart, Kolasch & Birch, LLP

(57) ABSTRACT

In a surface light source device including: a light source section having a light emitting face; an optical panel arranged so as to cover the light emitting face; and a at least one frame having a front face portion that covers the peripheral portion of the light emitting face, the at least one frame is composed of a plurality of divisional members connected with each other and a light shielding portion is provided at each slit between the divisional members in the front face portion of the at least one frame. Whereby, light from the light source section is prevented from leaking through each slit between the divisional members in the front face portion of the at least one frame.

7 Claims, 9 Drawing Sheets

SURFACE LIGHT SOURCE DEVICE AND LIQUID CRYSTAL DISPLAY DEVICE

CROSS REFERENCE TO RELATED APPLICATIONS

This Non-provisional application claims priority under 35 U.S.C. § 119(a) on Patent Application No. 2003-318683 filed in Japan on Sep. 10, 2003, and No. 2004-239881 filed in Japan on Aug. 19, 2004, the entire contents of which are hereby incorporated by reference.

BACKGROUND ART

The present invention relates to a surface light source device in which a frame is arranged along the peripheral portion of a light emitting face of a light source section, such as a liquid crystal display device including a backlight section as a light source section at a back face of a liquid crystal display panel, and particularly relates to improvement in the frame thereof.

In general, in a liquid crystal display device including a backlight section at the back face of a liquid crystal display panel, the liquid crystal display panel is mounted at a frame of the backlight section and a bezel (rim) is arranged on the peripheral portion of the liquid crystal display panel for reinforcing the liquid crystal display panel mounted and for protecting the peripheral portion of the liquid crystal display panel.

Meanwhile, upsizing of liquid crystal display devices used in liquid crystal television sets is recently being promoted. In association therewith, higher strength is demanded. While, the rim portion of the bezel is required to be narrowed. Therefore, it is difficult to increase the strength by widening the rim portion of the bezel.

To tackling this problem, Japanese Patent Application Laid Open Publication No. 2000-75273A discloses that the strength of the casing is increased without inviting increase in thickness thereof, which shall accompany widening of the peripheral portion of the bezel, by arranging a flame of an L shape in section having an opening at a part corresponding to a display region of a liquid crystal display panel between a back frame of a backlight section and the liquid crystal display panel.

Also, Japanese Patent Application Laid Open Publication No. 2003-50549A discloses that such a frame is composed of a plurality of divisional members obtained in such a manner that the members is cut out from a metal plate, bent into an L shape, and then, connected with each other by using a L-shaped metal fitting so that waste part of the metal plate is lessened and the strength of the frame is increased though the frame is composed of the plural divisional members, compared with the case where the frame is merely cut out from a metal plate.

Moreover, Japanese Patent Application Laid Open Publication No. 2001-249619A discloses that in the case where a frame of an L shape in section used in a liquid crystal display device is composed of a plurality of divisional members, each connected end portions of the plural divisional members of the frame are welded in the side face portion of the frame.

However, in the above conventional cases, small slits are liable to be formed at the connected portions between the divisional members in the front face portion of the frame, and light of the light source section leaks through the slits.

SUMMARY OF THE INVENTION

The present invention has been made in view of the above matter and has its main object of preventing, in a surface light source device such as a liquid crystal display device in which a frame composed of a plurality of divisional members connected is arranged along the peripheral portion of a light emitting face of a backlight section as a light source section arranged at the back side of a liquid crystal display panel as an optical panel, light of the light source section from leaking through slits between the divisional members in the front face portion of the frame.

To attain the above object, in the present invention, the at least one frame having a front face portion arranged so as to cover the peripheral portion of the light emitting face of the light source section and a side face portion extending from the outer periphery of the front face portion toward the light source section is composed of the divisional members connected with each other, and a light shielding portion is provided at each slit between the divisional members in the front face portion of the at least one frame, whereby the light shielding portion prevents light of the light source section from leaking through each slit.

Specifically, the surface light source device according to the present invention includes the light source section, the optical panel and the at least one frame. The light source section includes a light emitting face, and the optical panel is arranged so as to cover the light emitting face of the light source section. The optical panel performs a predetermined optical operation for light from the light source section. The at least one frame is arranged along a peripheral portion of the light emitting face of the light source section. The at least one frame includes a front face portion that covers the peripheral portion of the light emitting face of the light source section and a side face portion extending from the outer periphery of the front face portion toward the light source section, and a plurality of divisional members which are divided in a direction along the peripheral portions of the light emitting face of the light source section are connected with each other so as to compose the at least one frame.

At each slit between the divisional members in the front face portion of the at least one frame, a light shielding portion for preventing light of the light source section from leaking through the slit is provided.

It is noted that the above at least one frame may be a rear frame of which front face portion is located on the light source section side of the peripheral portion of the optical panel, may be a front frame of which front face portion is located on the side opposite the light source section side of the peripheral portion of the optical panel, or may include both the frames. Further, in the case where the rear frame and the front frame are provided, it is possible that the respective light shielding portions of the rear frame and the respective light shielding portions of the front frame may be arranged so as not to overlap or so as to overlap with each other in the thickness direction of the optical panel.

Moreover, it is preferable that the divisional members are connected by welding and each welded portion formed by the welding serves as the light shielding portion. Further, in the welding, if at least part of each slit between the divisional members in the side face portion is welded in addition to the welding of each slit between the divisional members in the front face portion, the torsional strength of the frame is increased in combination with the welding of the front face portion.

In addition, the above construction is applicable to a liquid crystal display device including a liquid crystal display panel having a pair of transparent substrates and a liquid crystal layer interposed between the pair of transparent substrates as the aforementioned optical panel. In this case, the light source section functions as the backlight section for the liquid crystal display panel.

DETAILED DESCRIPTION OF THE INVENTION

An embodiment of the present invention will be described below with reference to drawings.

Figure 1:
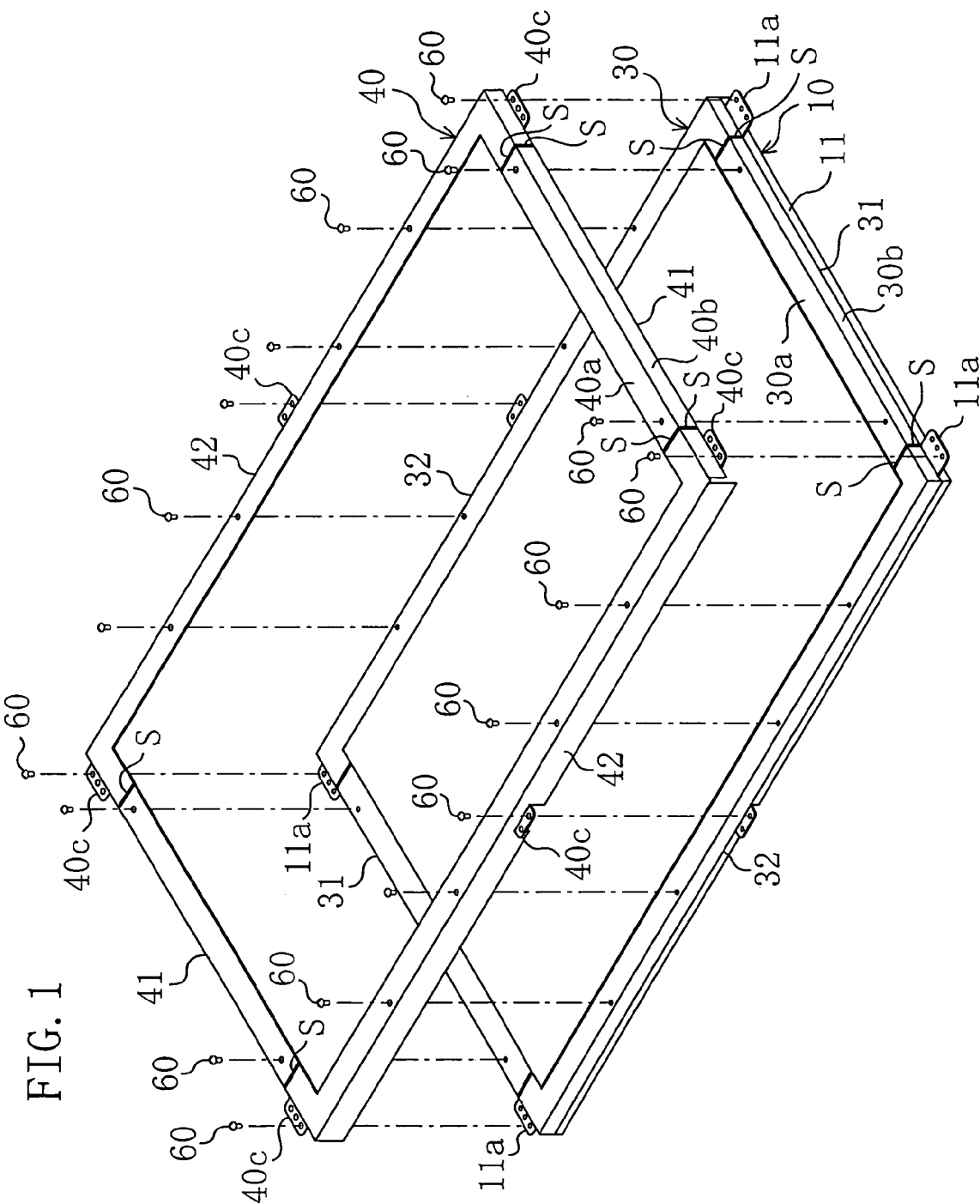
FIG. 1 is an exploded perspective view schematically showing a whole construction of a liquid crystal display device according to an embodiment of the present invention.
Figure 2:
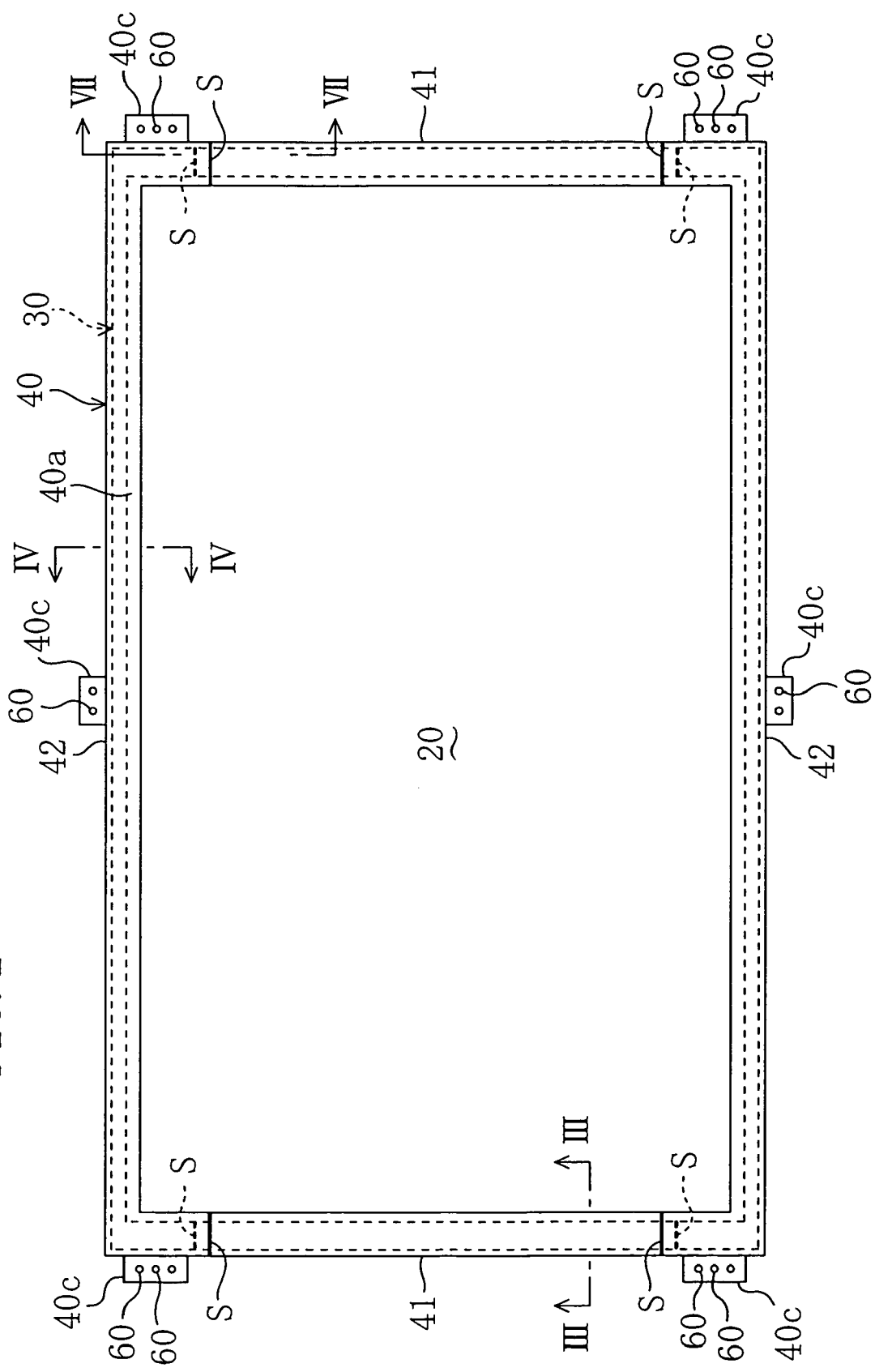
FIG. 2 is a front view schematically showing the whole construction of the liquid crystal display device.

FIG. 1 of an exploded perspective view and FIG. 2 of a front view show schematically the whole construction of a liquid crystal display device according to the embodiment of the present invention, wherein the liquid crystal display device is used as a display device for a 37-inch wide liquid crystal television set of which height to width ratio of the display screen is 9:16.

Figure 3:
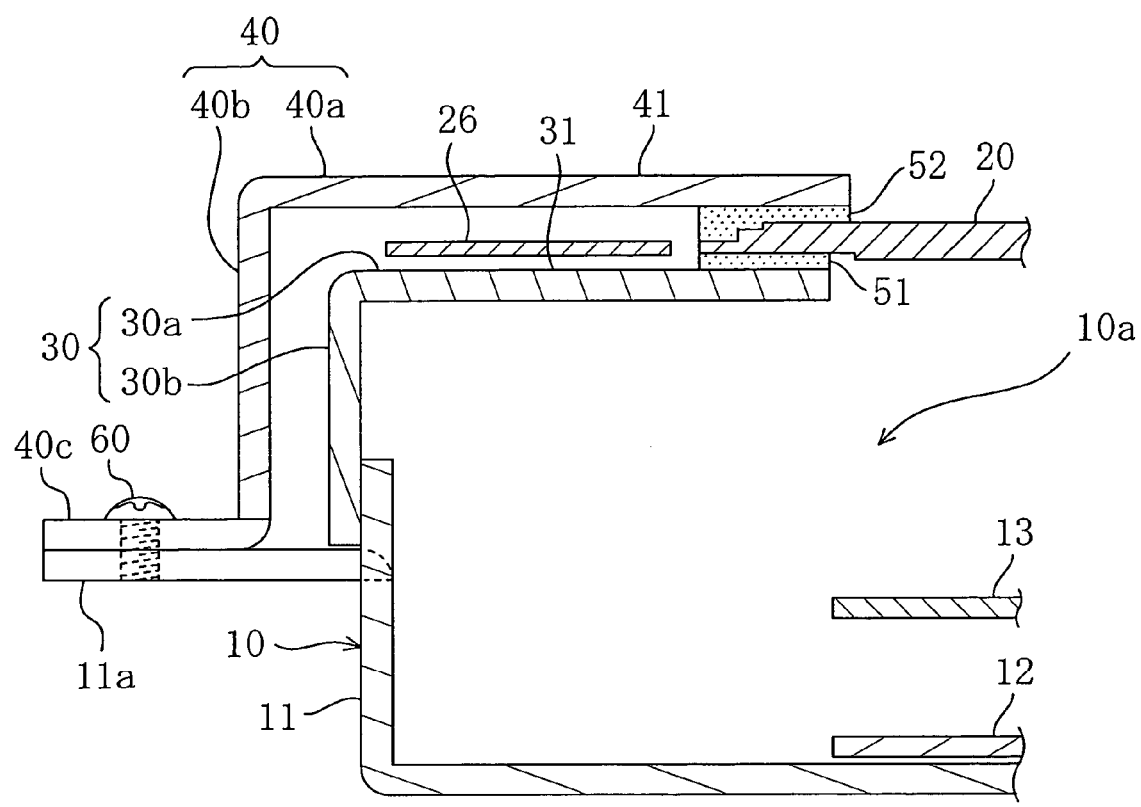
FIG. 3 is an enlarged section taken along the line III—III in FIG. 2.
Figure 4:
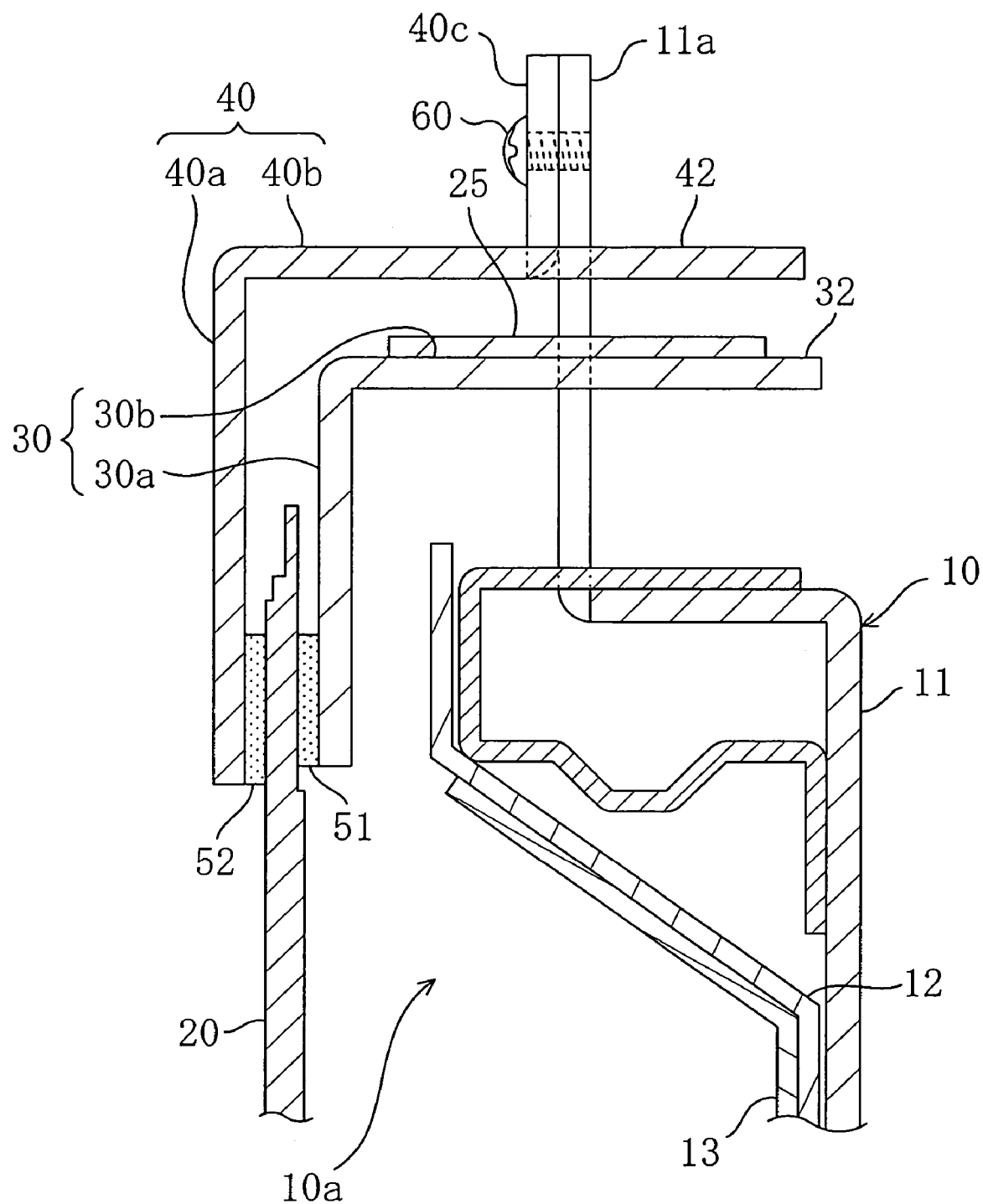
FIG. 4 is an enlarged section taken along the line IV—IV in FIG. 2.

As shown in FIG. 3, which is an enlarged section taken along the line III—III in FIG. 2, and FIG. 4, which is an enlarged section taken along the line IV—IV in FIG. 2, the liquid crystal display device includes: a backlight section 10 as a light source section having a rectangular light emitting face 10a; a liquid crystal display panel 20 as an optical panel arranged so as to cover the light emitting face 10a of the backlight section 10; a mounting frame 30 as a rear frame for fixing the liquid crystal display panel 20 to the backlight section 10; and a bezel 40 as a front frame for holding, with the use of the mounting frame 30, the peripheral portion of the liquid crystal display panel 20 in the direction of the thickness of the panel (the vertical direction in FIG. 3 and the transverse direction in FIG. 4).

The backlight section 10 of direct backlight type includes a back frame 11 of a rectangular shape in section, and a rectangular opening in which a light emitting face 10a of the backlight section 10 is formed is formed on the liquid crystal display panel 20 side of the back frame 11. In the peripheral side portion of the back frame 11, a mounting flange 11a protruding outward is provided at each central portion in the long side direction of the long side portions and each end portion in the short side direction of the short side portions. Inside of the peripheral side portion of the back frame 11, a support plate 12 is arranged so as to serve as a bottom portion for the back frame 11. A reflection sheet 13 is arranged on the support plate 12 and a plurality of line light sources such as cold-cathode tubes (not shown) are arranged in parallel on the reflection sheet 13.

Figure 5:
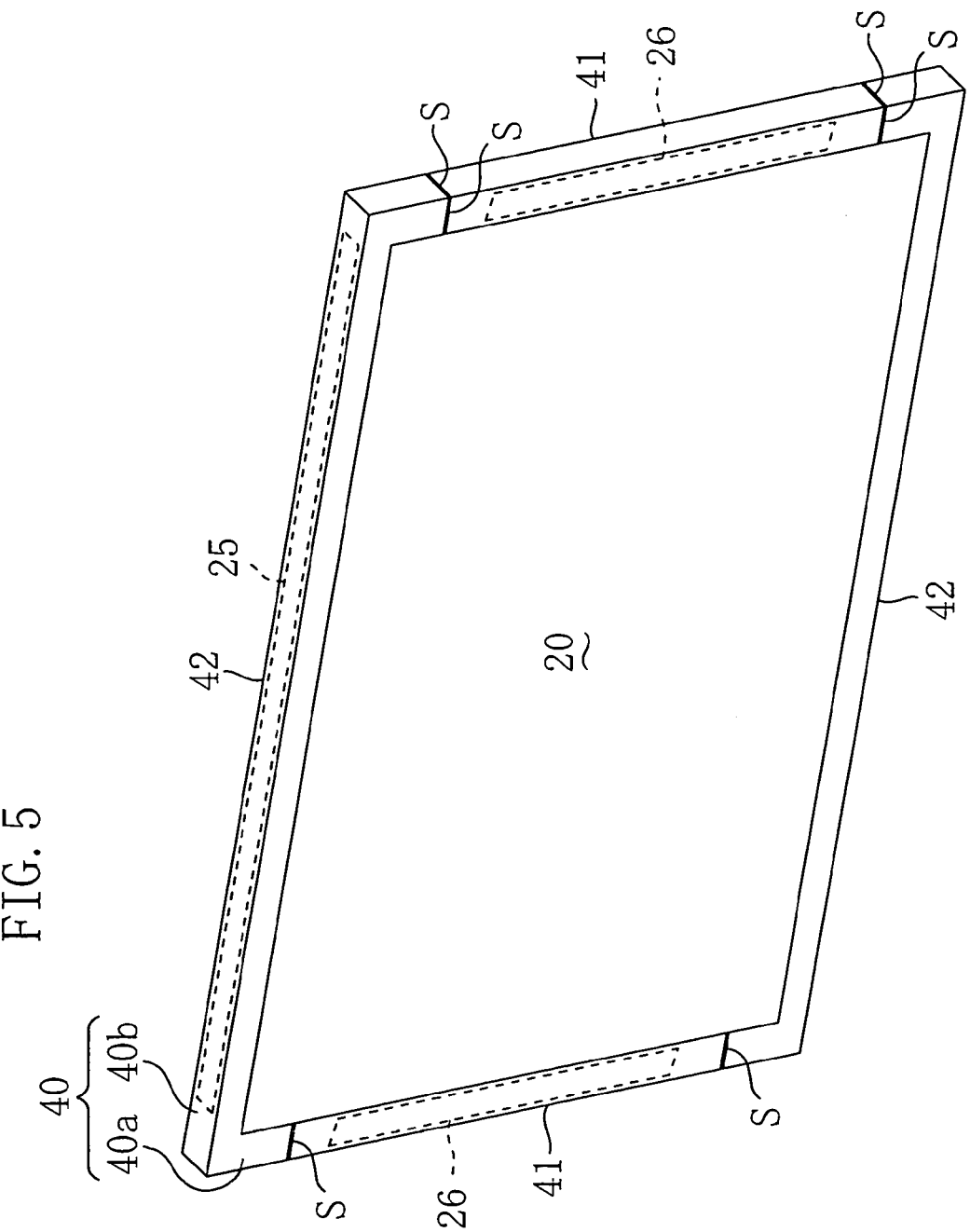
FIG. 5 is a perspective view showing an arrangement of driver circuits in the liquid crystal display device.

The liquid crystal display panel 20 is, for example, of active matrix type composed of a TFT substrate as a transparent substrate in which a pixel electrode portion and a TFT (Thin Film Transistor) are provided for each pixel, a CF substrate as a transparent substrate in which a counter electrode portion and a color filter layer are provided, and a liquid crystal layer interposed between the substrates, and polarizing plates are attached respectively to the surfaces of the electrode substrates opposite the respective surfaces on the liquid crystal layer side. In the liquid crystal display panel 20, data lines for transmitting a data signal to the source electrode of each TFT are extended in the short side direction and arranged along the long side direction, and scan lines for transmitting a scan signal to the gate electrode of each TFT are extended in the long side direction and arranged along the short side direction. Correspondingly, as schematically shown in FIG. 5 of the perspective view, a data driver circuit 25 for outputting the data signal to each TFT is provided so as to extend substantially over the entire range on one of the long sides of the liquid crystal display panel 20, and a scan driver circuit 26 for outputting the scan singal to each TFT is provided collectively at each substantial center on the short sides of the liquid crystal display panel 20. These driver circuits 25, 26 are arranged between the mounting frame 30 and the bezel 40. The data driver circuit 25 is arranged over the length substantially the same as that of the long sides along one of long sides of the liquid crystal display panel 20 so that the distances to the pixel electrode portions on the same scan line become minimum and equal to one another.

The mounting frame 30 is, as shown in FIG. 3 and FIG. 4, substantially in an L shape in section including a front face portion 30a that covers the peripheral portion of the light emitting face 10a of the backlight section 10 and a side face portion 30b extending from the outer periphery of the front face portion 30a toward the backlight section 10 (downward in FIG. 3 and rightward in FIG. 4). The front face portion 30a is located on the backlight section 10 side of the peripheral portion of the liquid crystal display panel 20, the side end portion of the side face portion 30b (lower side end portion in FIG. 3 and right side end portion in FIG. 4) is arranged so as to cover at least a part on the liquid crystal display panel 20 side of the side peripheral portion of the back frame 11 of the backlight section 10 (upper side end portion in FIG. 3 and left side end portion in FIG. 4) from the outside, and the mounting frame 30 is fixed at the side face portion 30b thereof to the back frame 11. Further, the mounting frame 30 supports the peripheral portion of the liquid crystal display panel 20 from the backlight section 10 side with intervening a cushion material 51 disposed at the liquid crystal display panel 20 side of the front face portion 30a (upper side in FIG. 3 and left side in FIG. 4).

Figure 6:
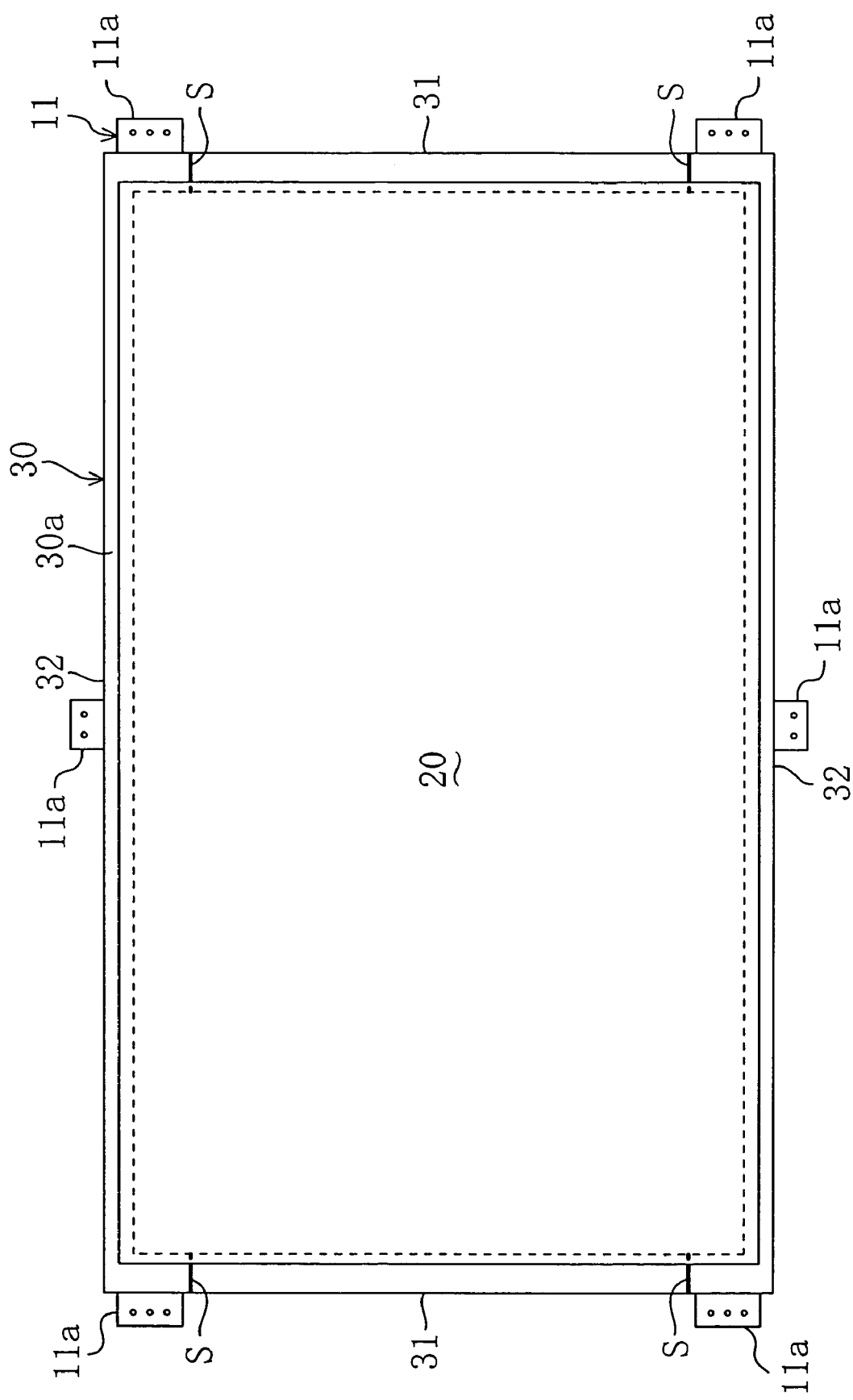
FIG. 6 is a front view schematically showing the liquid crystal display device of which bezel is taken away.

Furthermore, the mounting frame 30 is, as schematically shown in FIG. 6 of the front view, composed of two straight members 31 as divisional members each forming a straight portion except each end portion of the short side portions and two U-shaped members 32 as divisional members each formed of the long side portion and the end portions of the short side portions at respective end portions of the long side portion, wherein the respective end portions of the straight members 31 are connected with the respective end portions of the U-shaped members 32. Each of the straight members 31 and the U-shaped members 32 are made by bending a plate piece cut out into a predetermined shaped from a metal plate (e.g., an iron plate of about 1.6 mm in thickness), though not shown.

Similar to the mounting frame 30, the bezel 40 is substantially in an L shape in section including a front face portion 40a that covers the peripheral portion of the light emitting face 10a of the backlight section 10 and a side face portion 40b extending from the outer periphery of the front face portion 40a toward the backlight section 10, and the side face portion 40b is arrange so as to cover substantially the entirety of the side face portion 30b of the mounting frame 30 sideways (see FIG. 3 and FIG. 4). Wherein, the front face portion 40a is arranged at the side of the peripheral portion of the liquid crystal display panel 20, which is the opposite side to the front face portion 30a of the mounting frame 30 (upper side in FIG. 3 and lift side in FIG. 4), so that the bezel 40 holds, with the use of the front face portion 30a of the mounting frame 30, the peripheral portion of the liquid crystal display panel 20 with intervening a cushion material 52 disposed at the liquid crystal display panel 20 side of the front face portion 40a (lower side in FIG. 3 and right side in FIG. 4).

The front face portion 40a of the bezel 40 is fixed to the front face portion 30a of the mounting frame 30 by means of a plurality of screws 60. Mounting flanges 40c protruding outward are provided at the respective central portions in the long side direction of the respective long sides (the central portions in the transverse direction in FIG. 4) and each end portion of the respective short sides (both ends in the vertical direction in FIG. 3) in the side face portion 40b of the bezel 40 so as to correspond to the mounting flanges 11a of the back frame 11, respectively, and the mounting flanges 40c are fixed to the mounting flanges 11a of the back frame 11, respectively, by means of a plurality of screws 60. Whereby, the bezel 40 is mounted to the mounting frame 30 and the back frame 11.

Furthermore, similar to the mounting frame 30, the bezel 40 is composed of two straight members 41 as divisional members each forming a straight portion except each end portion of the short side portions and two U-shaped members 42 as divisional members each formed of the long side portion and the end portions of the short side portions at respective end portions of the long side portions, wherein the respective end portions of the straight members 41 are connected with the respective end portions of the U-shaped members 42 (see FIG. 2). Similar to the mounting framed 30, each of the straight members 41 and the U-shaped members 42 is formed by bending a plate piece cut out into a predetermined shape from a metal plate (e.g., an aluminum alloy plate of about 1.6 mm in thickness).

In the case where either one of the mounting frame 30 and the bezel 40 is formed of a single piece cut out into a predetermined shape from a metal plate, waste part after cutting out of the metal plate is increased in association with upsizing of the display region of a liquid crystal display device. While, in the present embodiment, both the mounting frame 30 and the bezel 40 are prepared by connecting the straight members 31, 41 and the U-shaped members 32, 42, each of which is obtained by bending a plate piece cut out from a metal plate and connecting them with each other, and accordingly, such waste part can be minimized. It is note that it is taken into consideration, as can be understood from FIG. 5, that each dividing point of the mounting frame 30 and the bezel 40 is located so as not to overlap with the data driver circuit 25 and the scan driver circuits 26 for the liquid crystal display panel 20. In each U-shaped member 32, 42 of the mounting frame 30 and the bezel 40, it is suitable that the corner portions, which are the joint portions of the end portions of the short sides and the end portions of the long sides, are formed by drawing so as to form no connection portions between the front face portions 30a, 40a and between the side face portions 30b, 40b.

Figure 7:
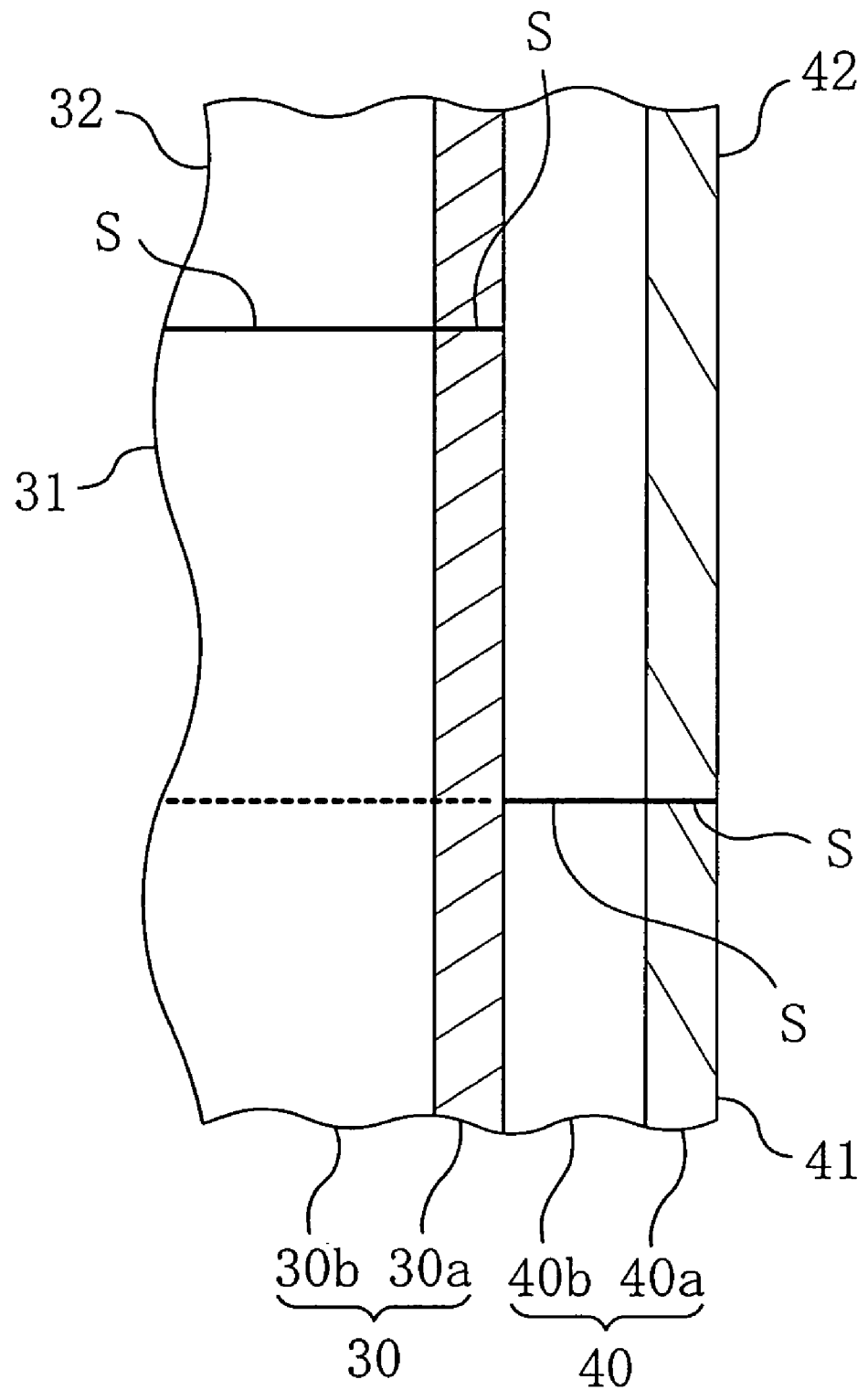
FIG. 7 is an enlarged section taken along the line VII—VII in FIG. 2.

In the present embodiment, as indicated in FIG. 7, an enlarged section taken along the line VII—VII in FIG. 2, the straight members 31 and the U-shaped members 32, which form the mounting frame 30, are connected by welding slits between the straight members 31 and the U-shape members 32 in the front face portion 30a of the mounting frame 30 in the entire region in the widthwise direction of the front face portion 30a, and each welded portions S formed by the welding serves as a light shielding portions in the present invention.

Further, in the slits between the straight members 31 and the U-shape members 32 of the mounting frame 30, in addition to the front face portions 30a, the side face portions 30b are welded over the entire region in the widthwise direction thereof, to form welded portions S.

Referring to the bezel 40, also, slits between the straight members 41 and the U-shaped members 42 in the front face portion 40a and slits between the straight members 41 and the U-shape members 42 in the side face portion 40b are welded over the respective entire regions in the respective widthwise directions, to form welded portions S (See FIG. 7), similar to the mounting frame 30. It should be noted that an arc welding may be employed as one example of the welding method but no limitation is imposed specifically only if no light leaks through the welded portions S.

Thus, according to the present embodiment, the liquid crystal display device includes: the backlight section 10 which has the light emitting face 10a; the liquid crystal display panel 20 which is arranged so as to cover the light emitting face 10a of the backlight section 10 and capable of changing the transmittance of light from the backlight section 10 in each pixel; the mounting frame 30 which has the front face portion 30a that covers the peripheral portion of the light emitting face 10a of the backlight section 10 at the backlight section 10 side of the liquid crystal display panel 20, and the side face portion 30b extending from the outer periphery of the front face portion 30a toward the backlight section 10, and which is arranged along the peripheral portion of the light emitting face 10a of the backlight section 10; and the bezel 40 which has the front face portion 40a that covers the peripheral portion of the light emitting face 10a of the backlight section 10 at the side opposite the backlight section 10 side of the peripheral portion of the liquid crystal display panel 20 and the side face portion 40b extending from the outer periphery of the front face part 40a toward the backlight section 10, and which is arranged along the peripheral portion of the light emitting face 10a of the backlight section 10, wherein each of the mounting frame 30 and the bezel 40 is formed in a manner that the two straight members 31, 41 and the two U-shaped members 32, 42 are respectively connected with each other by welding the respective entire regions of the slits in the front face portions 30a, 40a and the respective entire regions of the slits in the side face portions 30b, 40b. Whereby light from the backlight section 10 is prevented from leaking through each slit between the straight members 31, 41 and the U-shaped members 32, 42 in the front face portions 30a, 40a and each slit between straight members 31, 41 and the U-shaped members 32, 42 in the side face portions 30b, 40b of the mounting fame 30 and the bezel 40.

Further, each of the straight members 31, 41 and the U-shape members 32, 42 of the mounting frame 30 and the bezel 40 are connected not only by welding each slit in the front face portions 30a, 40a but also by welding each slit of the side face portions 30b, 40 b, and therefore, the torsional strength of the mounting frame 30 and the bezel 40 can be increased, compared with the case where only each slit in the front face portions 30a, 40a is welded.

It is noted that the respective sections of the mounting frame 30 and the bezel 40 are substantially in an L shape in the above embodiment, but may be designed optionally according to needs.

Figure 8:
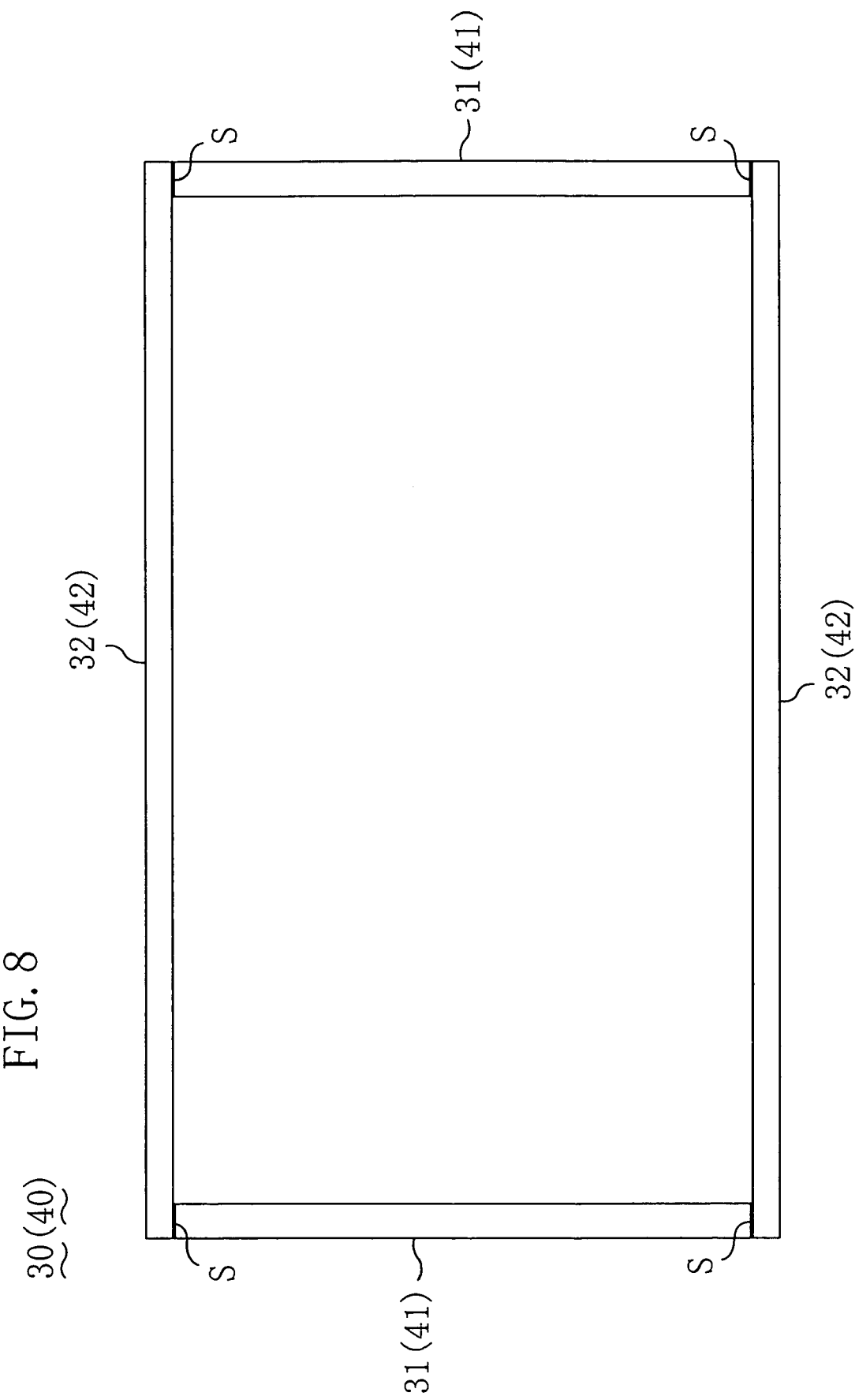
FIG. 8 is a front view schematically showing Modified Example 1 of the present embodiment.

Further, the mounting frame 30 and the bezel 40 are each divided into the two straight members 31, 41 and the two U-shaped members 32, 42 in the above embodiment, but the number of division and the shapes of the divisional members may be set optionally. In detail, for example, the mounting frame 30 (or the bezel 40) may be divided into two shorter straight members 33 (43) and two longer straight members 34 (44) as in Modified Example 1 shown in FIG. 8 of the front view.

Furthermore, the entire regions in the respective widthwise directions of the slits between the straight members 31, 41 and the U-shaped members 32, 42 in the side face portions 30b, 40b of the mounting frame 30 and the bezel 40 are welded in the above embodiment, but only part thereof may be welded.

Moreover, both the mounting frame 30 and the bezel 40 are composed of the plural divisional members connected with each other in the above embodiment, but either one of the mounting frame 30 and the bezel 40 may be composed of the plural divisional members connected with each other.

Further, the members are connected by welding and each welded potions serves as the light shielding portion S in the above embodiment, but the members may be connected by known connection means other than welding, or it is possible that the members are connected by an exclusive connecting method and known shielding means other than welding may be employed as the light shielding portions.

Figure 9:
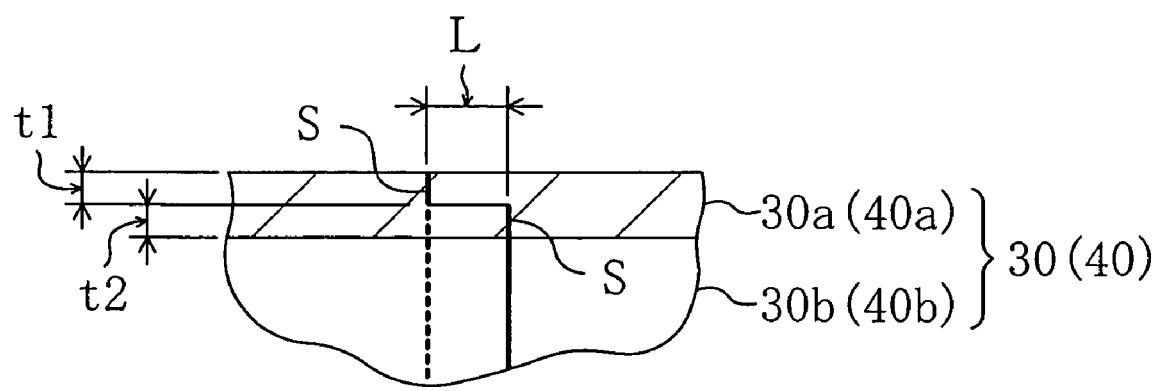
FIG. 9 is an enlarged section schematically showing Modified Example 2 in the present embodiment.

Furthermore, each end potion of the divisional members of the mounting frame 30 and the bezel 40 is formed in a shape having an end face cut by a plane intersecting with the dividing direction at a right angle in the above embodiment, but it is possible, as shown in Modified Example 2 of FIG. 9, which corresponds to FIG. 7, that: one of the end portions is formed in a step-like shape of which part on the light source section side is cut off in the panel thickness direction by a predetermined length L in the dividing direction (sideways in FIG. 9); the other end portion is formed in a step-like shape of which part on the side opposite the light source section side is cut off in the panel thickness direction; the end portions are overlaid with each other so as to fill up the respective cut off portions; and then, the end portions facing with each other in the dividing direction are welded. In this case, in order to obtain sufficient strength at the overlaid portions, it is preferable to set the thicknesses t1, t2 of the overlaid portions at the end portions to be substantially equal to each other (t1≈t2), and the length L of the overlaid portions is preferably about 2 mm.

Moreover, the mounting frame 30 and the bezel 40 are made of metal materials such as an iron plate, an aluminum alloy plate, in the above embodiment, but may be made of nonmetallic materials only if they are capable of being welded.

Further, the case where each substrate includes the electrode portion is referred to in the above embodiment, but the present invention is applicable to various types of liquid crystal display devices such as IPS (In Plane Switching) type liquid crystal display devices in which only one of substrates includes an electrode portion.

Furthermore, the liquid crystal display device including the backlight section 10 of direct backlight type in which the line light source is disposed immediately below the liquid crystal display panel 20 is referred to in the above embodiment, but the backlight section 10 is not limited thereto and may be, for example, of edge lighting type in which a line light source is located on the side edge of the display region of the liquid crystal display panel 20.

In addition, the liquid crystal display device is exemplified in the above embodiment, but the present invention is, of course, applicable to other types of surface light source devices.

What is claimed is:

1. A surface light source device, comprising:
a light source section which has a light emitting face;
an optical panel which is arranged so as to cover the light emitting face of the light source section and which performs a predetermined optical operation for light from the light source section; and
at least one frame which includes a front face portion arranged so as to overlap with a peripheral portion of the optical panel in a direction of a thickness of the optical panel and a side face portion extending from an outer periphery of the front face portion toward the light source section and which is arranged along a peripheral portion of the light emitting face of the light source section;
wherein the at least one frame is composed of a plurality of divisional members divided in a direction along the peripheral portion of the light emitting face of the light source section, which have a slit between each divisional member, and
a light shielding portion is provided, at each said slit in the front face portion of the frame, for preventing light of the light source section from leaking through each said slit,
wherein the divisional members include a u-shaped member, and
wherein the corner portion of the u-shaped member is formed by drawing.

2. The surface light source device of claim 1, wherein the at least one frame serves as a rear frame of which front face portion is provided on the light source section side of the peripheral portion of the optical panel so as to cover the peripheral portion of the light emitting face of the light source section.

3. The surface light source device of claim 1 wherein the at least one frame serves as a front frame of which front face portion is provided on a side opposite the light source section side of the peripheral portion of the optical panel so as to cover the peripheral portion of the light emitting face of the light source section.

4. The surface light source device of claim 1, wherein the at least one frame includes:
a rear frame of which front face portion is provided on the light source section side of the peripheral portion of the optical panel so as to cover the peripheral portion of the light emitting face of the light source section; and
a front frame of which front face portion is provided on a side opposite the light source section side of the peripheral portion of the optical panel so as to cover the peripheral portion of the light emitting face of the light source section.

5. The surface light source device of claim 1, wherein
the connection between the plural divisional members are carried out by welding, and
the light shielding portion is formed of a welded portion formed by the welding.

6. The surface light source device of claim 5, wherein
the welded portion is formed at each slit between the plural divisional members in the side face portion, in addition to each slit between the plural divisional members in the front face portion.

7. A liquid crystal display device, comprising a surface light source device according to any one of claims 2, 3, 4, 5, 6 and 1, wherein
the optical panel serves as a liquid crystal display panel including a pair of transparent substrates and a liquid crystal layer disposed between the pair of transparent substrates, and
the light source section serves as a backlight section for emitting light to the liquid crystal display panel.

* * * * *